March 20, 1928.

F. SEMMLER 1,663,182

LINE TIGHTENING TOOL

Filed May 10, 1927

Inventor
*Frank Semmler,*

By *Clarence A. O'Brien*
Attorney

Patented Mar. 20, 1928.

1,663,182

UNITED STATES PATENT OFFICE.

FRANK SEMMLER, OF WEST ALLIS, WISCONSIN.

LINE-TIGHTENING TOOL.

Application filed May 10, 1927. Serial No. 190,236.

The present invention relates to an improved product of manufacture, which is herein conveniently entitled a Line tightening tool; that is, a small handly tool, for use more particularly on clothes lines and cables for taking up slack.

My primary aim is to provide an exceptionally simple and inexpensive product, which is characterized by exclusive and distinguishing features of construction, arranged to produce a meritorious and efficient article.

Structurally the device comprises a lever, an operating handle at one end, a winding drum at the opposite end, and novel retaining means at the first named end.

Other features and advantages of the invention will be made apparent from the following description and drawings.

In the accompanying drawings, forming a part of this application and in which like numerals are employed to designate like part throughout the same—

Figure 1:
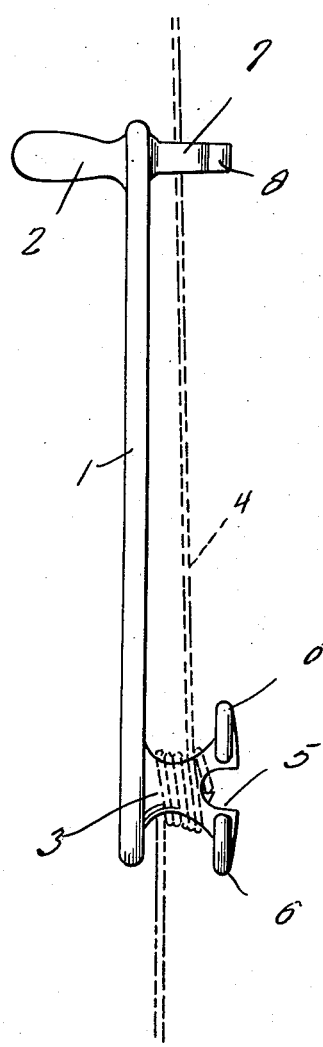
Figure 1 is a side elevation of a tool, constructed in accordance with the invention, showing the approximate manner of use.
Figure 2:
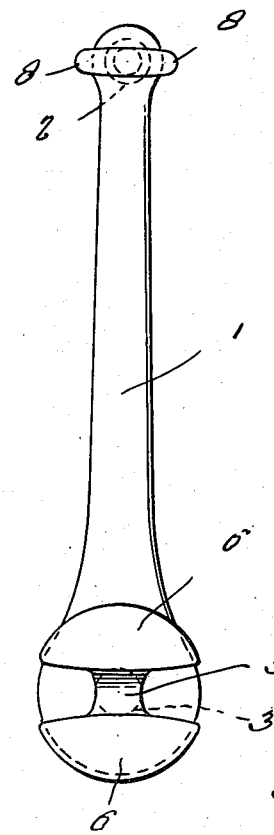
Figure 2 is a view looking from right to left in Figure 1, or showing the device turned approximately through a 90° angle.
Figure 3:
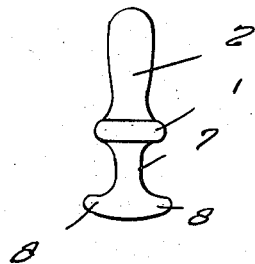
Figure 3 is a view observing one end of the tool.
Figure 4:
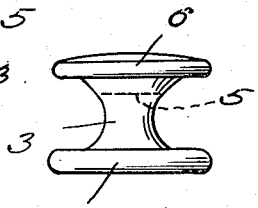
Figure 4 is a view observing the opposite end of the same.

In carrying out the invention, I provide a single body in the form of a malleable iron casting. This is cast to provide a substantially flat lever 1, having an appropriate hand grip 2 on one end. Formed at the opposite side and on the opposite end is an outstanding portion 3, which is fashioned to provide a winding drum for the convolutions of the line or cable 4. Formed in the outer end of this drum is a notch 5 for reception of that portion of the line which is adapted to be wound upon the drum. Also, at this point we find a pair of segmental rope confining flanges 6 the peripheral edges of which are preferably rounded to prevent cutting of the line. These flanges are of duplicate configuration, as better seen in Figure 2.

Formed on the same side of the lever, at the opposite end thereof is a projection 7, provided with outstanding lugs forming hooks 8. The portions 7 and 8 operate to provide what may be designated as a keeper.

The device, in practice, may be placed above and in parallelism with a clothes line, for instance, with a portion of the line disposed in the seat or notch 5. Then the device is manipulated in a way to wind the line about the drum 3. The device can be turned in either direction. When the slack is taken up sufficiently, the keeper is engaged with the line to prevent unwinding of the device, against accidental displacement thereof, either one or the other of the hooks 8 being engaged with the line depending on the direction of the winding.

In practice, the devices will be made in various sizes, to permit convenient use in connection with an ordinary small clothes line, or with larger cables. When used on a clothes line, the device will be either nickel plated or enamelled to prevent corrosion and subsequent soiling of the line or clothes suspended therefrom. The device will occupy a comparatively small space, and will therefore not interfere with the hanging of clothes. With two or three of these devices on the line, the latter can be made sufficiently taut to make it possible to do away with a line prop.

These and other advantages and features of the invention have doubtless been made apparent from the foregoing description and the drawing, and therefore a more lengthy description is deemed to be unnecessary.

Minor changes coming within the field of invention claimed may be resorted to, if desired.

I claim:

As a new product of manufacture, a lever provided at one end and on one side with right angularly disposed winding drum about which a portion of the line is adapted to be coiled, said drum being formed at its outer end with a notch to facilitate the winding of the line on the drum, retaining flanges formed on said drum adjacent said notch, a keeper at the opposite end of the lever and on the same side thereof, said keeper comprising an angularly disposed extension provided with oppositely extending retaining hooks, and a hand grip at the last named end of the lever and on the opposite side of the latter.

In testimony whereof I affix my signature.

FRANK SEMMLER.